J. CASSIDY.
APPARATUS FOR MAKING TUBING.

No. 104,111.  Patented June 14, 1870.

Witnesses;
Chas F. Brown
Lucius B. Wright

Inventor;
James Cassedy
by Carroll D. Wright
Atty.

UNITED STATES PATENT OFFICE.

JAMES CASSIDY, OF EAST BOSTON, MASSACHUSETTS, ASSIGNOR TO HIMSELF AND HARVEY K. FLAGLER, OF SAME PLACE.

IMPROVED APPARATUS FOR MAKING TUBING.

Specification forming part of Letters Patent No. 104,111, dated June 14, 1870.

*To all whom it may concern:*

Be it known that I, JAMES CASSIDY, of East Boston, in the county of Suffolk and State of Massachusetts, have invented an Improved Apparatus for Making Tubing; and I do hereby declare that the following is a full, clear, and exact description of the same, reference being had to the accompanying drawing and letters of reference marked thereon, making a part of this specification, in which—

Figure 1:
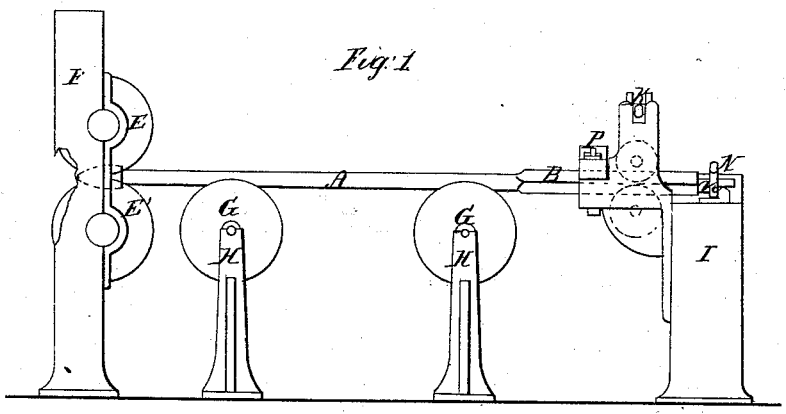
Figure 2:
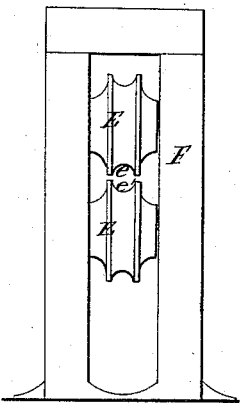
Figure 3:
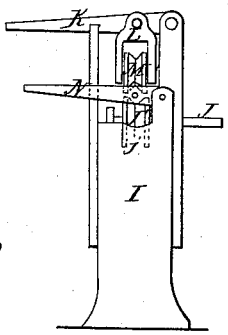
Figure 4:
Figure 5:
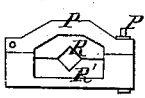

Figure 1 is a side elevation of my invention; Figs. 2 and 3, end elevations of the same, and Figs. 4, 5, and 6 views in detail.

The object of this invention is to prevent the round ball, bar and ball, used in welding iron tubes, pipes, flues, &c., from turning during the welding operation; and it consists in holding said bar from turning laterally by constructing one end of the same of a square or other equivalent form, and providing the other end with a square pin, which fits into a similar socket in the ball, the square end resting between two correspondingly-grooved rollers, or by inserting a pin through said bar for the same purpose, and in holding said ball by means of a square or equivalent shaped pin and socket.

The bar in common use is round, and has a round pin on the end which holds the ball. It will thus be seen that there is nothing to prevent either bar or ball from turning and twisting the pipe which is being welded.

I obviate this difficulty by providing the bar A with the square, octagonal, or other equivalent shaped end B. C represents the ball, which is acorn or cone shaped, its diameter at the base being somewhat greater than that of the rod. The ball C is provided with the square or equivalent shaped socket D, into which enters a correspondingly-shaped pin on the end of the rod. E E' represent welding-rollers, arranged vertically, and provided with semicircular grooves e e', so that when any part of the peripheries of said rollers is placed in contact a circular opening is formed by the grooves. The rollers E have their bearings in the frame-work F, and are so arranged that their peripheries do not quite come together. G G represent rollers, which are grooved like rollers E E', located in standards H, and are on a level with roller E'. I represents a framework on the rear end of the machine, in which is located the shaft J of roller J', which is provided with the triangular, half-octagonal, or other shaped groove j. K represents a transverse lever, pivoted to one side of the upper part of frame I. To the center of lever K is pivoted the bifurcated piece L, in which is located the roller M, which is directly above roller J', and is grooved in a like manner, and when the rollers come in contact a square, diamond-shaped, octagonal, or other opening is formed, in which rests the end B of rod A. N represents a transverse lever, which is pivoted to the end of frame I near lever K, and is provided with the pin n, against the head of which the end B bears. P represents a transverse yoke, which is pivoted at one end to the frame I, and is secured by a pin, p, at the other. Under the yoke P are the blocks R R', which are held in place thereby, and are grooved to correspond with the shape of end B, which passes through the same.

Operation: The metal which is to be welded into tubing is heated and bent into the requisite form, passed through rollers E E' and around ball C and rod A, and welded in the usual manner. As fast as the welding is performed the tube runs backward over rollers G until a section is formed which reaches to the end B. The welding then ceases. The lever N is raised, and suitable power applied to shaft J of roller J', and the lever K, with its roller M, is pressed down, which forces the rod A into close contact with the same, and causes it to be carried away, leaving the section of tubing resting on the roller G, from whence it may be removed in any suitable manner.

Should the bar A become accidentally bent, so that it cannot be removed by roller J', as described, the yoke P and blocks R R' may be removed, and the lever K, with its roller M, be swung out of place, which will enable the bar to be readily removed.

The ball C, which, by the old method, suffices for but one welding operation, as it becomes bruised on one side, may answer for several operations by changing its position on the end of rod A, which latter may be held firmly by means of a pin or other suitable means, instead of the device shown.

Figure 6:

The ball may be held in place by means of feathers on the end of rod A and corresponding grooves in the socket, as shown in Fig. 6.

Having thus fully described my invention, what I claim as new, and desire to secure by Letters Patent of the United States, is—

1. The bar A, provided with the many-sided head B, and combined with the blocks R R', yoke P, and ball C, in the manner and for the purpose specified.

2. The combination and arrangement of friction-rollers M J', lever K, and piece L, substantially as described.

In testimony whereof I have signed my name to this specification in the presence of two subscribing witnesses.

JAMES CASSIDY.

Witnesses:
CARROLL D. WRIGHT,
CHARLES F. BROWN.